United States Patent [19]

Aoki et al.

[11] Patent Number: 5,212,252

[45] Date of Patent: May 18, 1993

[54] ROOM-TEMPERATURE CURABLE RESIN COMPOSITION CONTAINING ACRYLIC POLYMER HAVING ALICYCLIC EPOXIDE FUNCTIONS

[75] Inventors: Kei Aoki, Ikoma; Tadafumi Miyazono, Mino; Hirohiko Mori, Settsu, all of Japan

[73] Assignee: Nippon Paint Co., Ltd., Japan

[21] Appl. No.: 791,503

[22] Filed: Nov. 14, 1991

[30] Foreign Application Priority Data

Nov. 14, 1990 [JP] Japan .................................. 2-310001

[51] Int. Cl.$^5$ ............................................ C08F 20/32
[52] U.S. Cl. ................................. 525/327.3; 525/337; 525/340; 525/343; 525/355; 525/359.1; 526/266; 526/268
[58] Field of Search ..................... 525/327.3; 526/266, 526/268

[56] References Cited

U.S. PATENT DOCUMENTS

| | | | |
|---|---|---|---|
| 4,677,137 | 6/1987 | Bany | 522/31 |
| 4,772,672 | 9/1988 | Isozaki | 526/273 |
| 4,923,930 | 5/1990 | Iwasawa | 525/168 |
| 4,923,945 | 5/1990 | Isozaki | 528/16 |
| 4,972,027 | 11/1990 | Isozaki | 525/365 |
| 5,043,366 | 8/1991 | Isozaki | 523/410 |

*Primary Examiner*—Joseph L. Schofer
*Assistant Examiner*—Fred Zitomer
*Attorney, Agent, or Firm*—Townsend, Snider & Banta

[57] ABSTRACT

A room-temperature curable resin composition comprising (a) an acrylic polymer having a plurality of alicyclic epoxide functions, and (b) an amount effective to initiate the curing reaction at room-temperature of the acrylic polymer (a) of a proton-donating cation polymerization initiator. The composition finds its uses in coating compositions, sealants, potting and casting compositions.

5 Claims, No Drawings

ROOM-TEMPERATURE CURABLE RESIN COMPOSITION CONTAINING ACRYLIC POLYMER HAVING ALICYCLIC EPOXIDE FUNCTIONS

BACKGROUND OF THE INVENTION

This invention relates to a novel resinous composition containing an acrylic polymer having a plurality of alicyclic epoxide functions. The composition may be cured or crosslinked through the cationic polymerization of the epoxide function and is useful as a resinous component of coating compositions, sealants, potting or casting compositions and the like.

Cationic polymerization of epoxy resins using a cationic polymerization initiator is well-known. Usable initiators include Lewis acids, Friedel-Crafts catalyst, boron trifluoride-ether complex, photodegradable onium salts (S, Se, Te), diallyl iodonium salts and the like.

Epoxy resins or polymers used heretofore for this purpose are limited to glycidyl ether or ester epoxy resins, typically bishenol A epoxy resins, and homo- and copolymers of glycidyl acrylate or methacrylate (hereinafter collectively referred to as "(meth)acrylate"). Cation polymerization of these glycidyl epoxy resins normally requires heating.

We have now found that acrylic polymers having a plurality of alicyclic epoxide functions are more sensitive to the cationic polymerization than glycidyl epoxy resins in the presence of a proton-donating cationic polymerization initiator and therefore may be cured even at room temperature. The present invention has its basis on this finding.

SUMMARY OF THE INVENTION

According to the present invention, there is provided a curable resin composition comprising:

(a) an acrylic polymer having a plurality of alicyclic epoxide functions and a mean molecular weight (i.e., number average molecular weight) of greater than 1,000; and (b) an amount effective to initiate the curing reaction of said acrylic polymer at room temperature of a proton-donating cation polymerization initiator.

The composition may contain a polyfunctional alicyclic epoxide compound as a crosslinking agent and/or a polyol as a chain extender, and various conventional additives such as solvents, pigments, UV absorbers, and the like depending upon the end use of the composition.

The alicyclic epoxide functions possessed by the arylic polymers used in the present inventions are more sensitive to the cationic polymerization reaction than glycidyl groups. For example, glycidyl epoxy resins do not undergo a cationic polymerization reaction with a proton-donating initiator at room temperature, while acrylic polymers having alicyclic epoxide functions may be cured with such initiators even at room temperature.

DETAILED DISCUSSION

Acrylic Polymers having Alicyclic Epoxide Functions

Acrylic polymers having alicyclic epoxide functions may be prepared by polymerizing or copolymerizing an acrylic monomer having an alicyclic epoxide function. The term "alicyclic epoxide function" as used herein refers to an epoxide bridge formed between two adjacent carbon atoms of an alicyclic ring. Examples of these acrylic monomers may be classified into the following three groups.

I. (Meth)acrylate esters such as:
3,4-epoxycyclohexylmethyl (meth)acrylate;
2-(1,2-epoxy-4,7-methano-perhydroinden-5(6)-yl)oxyethyl (meth)acrylate;
5,6-epoxy-4,7-methano-perhydroinden-2-yl (meth)acrylate:
1,2-epoxy-4,7-methano-perhydroinden-5-yl (meth)acrylate;
2,3-epoxycyclopentenylmethyl (methacrylate); and
3,4-epoxycyclohexylmethylated polycaprolactone (meth)acrylate of the formula:

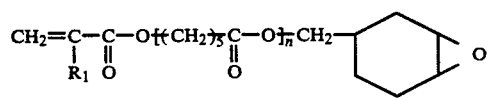

wherein $R^1$=H or $CH_3$ and n=1-10.

II. Adducts of (meth)acrylic acid with a polyfunctional alicyclic epoxy compound such as:
3,4-epoxycyclohexyloxirane of the formula:

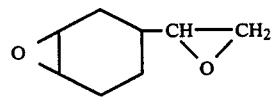

3′,4′-epoxycyclohexylmethyl 3,4-epoxycyclohexanecarboxylate of the formula:

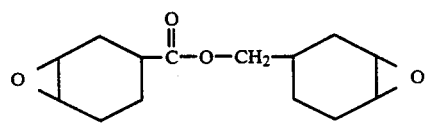

1,2,5,6-diepoxy-4,7-methano-perhydroindene of the formula:

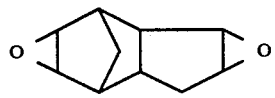

2-(3,4-epoxycyclohexyl)-3′,4′-epoxy-1,3-dioxane-5-spirocyclohexane of the formula:

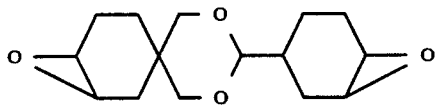

1,2-ethylenedioxy-bis(3,4-epoxycyclohexylmethane) of the formula:

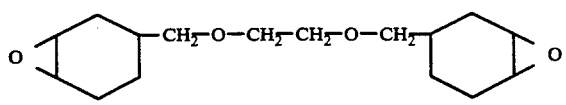

1,3-dimethyl-2,3-epoxycyclohexyloxirane of the formula:

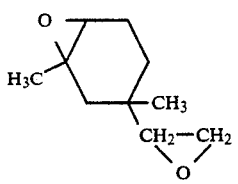

di-(2,3-epoxycyclopentyl)ether of the formula:

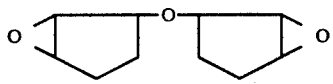

4',5'-epoxy-2'-methylcyclohexylmethyl 4,5-epoxy-2-methylcyclohexanecarboxylate of the formula:

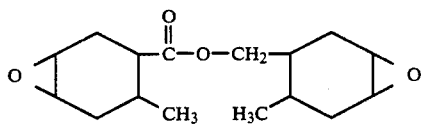

bis-(3,4-epoxycyclohexylmethyl)adipate;
bis-(4,5-epoxy-2-methylcyclohexylmethyl)adipate; and
ethyleneglycol bis (3,4-epoxycyclohexanecarboxylate).

III. Adducts of alicyclic epoxide alcohols with (meth)acrylisocyanate or isocyanotoethyl (meth)acrylate or m-isopropenyl-α,α-dimethylbenzylisocyanate such as:
N-(3,4-epoxycyclohexyl)methylcarbonyl(meth)acrylamide;
N-(5,6-epoxy-4,7-methano-perhydroinden-2-yl)oxycarbonyl-(meth)acrylamide; and
adduct of 3,4-epoxycyclohexylmethylated polycaprolactone with (meth)acrylisocyanate of the formula:

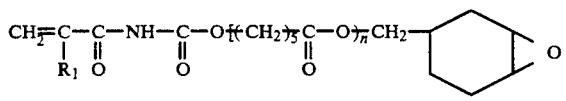

wherein $R^1$ = H or $CH_3$ and n = 1–10.

Above acrylic monomers may preferably copolymerized with other monomers free of the alicyclic epoxide function. Examples of such comonomers include non-alicyclic epoxy group-containing monomers such as glycidyl (meth)acrylate; hydroxyl group-containing monomers such as 2-hydroxyethyl (meth)acrylate, 3-hydroxypropyl (meth)acrylate, 4-hydroxybutyl (meth)acrylate, 4-hydroxystyrene, 2-(2-hydroxyethoxy)ethyl (meth)acrylate, N-(2-hydroxyethyl)acrylamide, reaction products of polycaprolactone with (meth)acrylic acid (PLACCEL FA and PLACCEL FM sold by Daicel Chemical Industries, Ltd.), reaction products of polymethylvalerolactone with (meth)acrylic acid, polyethyleneglycol mono(meth)acrylate, polypropyleneglycol mono(meth)acrylate and polytetramethyleneglycol mono(meth)acrylate; and other monomers such as styrene, α-methylstyrene, methyl (meth)acrylate, ethyl (meth)acrylate, n-propyl (meth)acrylate, isopropyl (meth)acrylate, n-butyl (meth)acrylate, sec.-butyl (meth)acrylate, t-butyl (meth)acrylate, 2-ethyl-hexyl (meth)acrylate, lauryl (meth)acrylate, stearyl (meth)acrylate, vinyl acetate, vinyl propionate and the like.

The polymerization may be carried out by the solution polymerization technique using a conventional radical polymerization initiator. Examples of solvents used in the solution polymerization include aliphatic hydrocarbons such as cyclohexane, dipentene and hexane; aromatic hydrocarbons such as benzene, toluene, ethylbenzene and aromatic petroleum naphtha; halogenated hydrocarbons such as dichloromethane, dichloroethane, carbon tetrachloride, chlorform and dichlorobenzene; nitrated hydrocarbons such as nitrobenzene, nitromethane and nitroethane; ethers such as dioxane, tetrahydrofuran, and dibutyl ether; glycol ethers such as ethyleneglycol monomethyl ether, ethyleneglycol monoethyl ether, ethyleneglycol monobutyl ether, ethyleneglycol monoethyl ether acetate, diethyleneglycol monomethyl ether, diethyleneglycol monoethyl ether and diethyleneglycol monobutyl ether; ketones such as methyl ethyl ketone, ethyl isobutyl ketone, cyclohexanone, acetone and isophorone; alcohols such as methanol, ethanol, isopropanol, n-propanol, butanol, 2-ethylhexanol and cyclohexanol; esters such as ethyl acetate and butyl acetate; and mixtures of these solvents.

The resulting acrylic polymer should have a number average molecular weight of greater than 1,000. The upper limit of molecular weight generally lies at about 500,000. A molecular weight ranging between about 3,000 and about 10,000 is preferable. If the molecular weight is too low, the mechanical strength of the resulting cured products is not satisfactory. Conversely, if the molecular weight is two high, the polymer is too viscous resulting in decrease workability of compositions containing the same.

Cationic Polymerization Initiators

It is well-known that glycidyl-terminate epoxy resins such as bisphenol A epoxy resins may be cured with a proton-donating initiator such as Lewis acids. Such initiators may also be used in the composition of this invention. Examples of such initiators include Bronsted acids such as hydrofluoric acid, hydrochloric acid, hydrobromic acid, sulfuric acid, p-toluenesulfonic acid, dodecylbenzenesulfonic acid, methanesulfonic acid, trifluoroacetic acid, and trifluoromethanesulfonic acid; Lewis acids such as boron trifluoride and its diethyl ether complex, aluminum chloride, tin tetrachloride, zinc chloride, titanium tetrachloride, phosphotungstic acid, phosphomolybdic acid, silicotungstic acid and silicomolybdic acid; and hexafluoroantimonates, hexafluoroarsenates, tetrafluoroborates, hexafluorophosphates and trifluoromethanesulfonates of a primary, secondary or tertiary amine such as diethylamine trifluoromethanesulfonate, triethylamine hexafluoroantimonate, triethylamine tetrafluoroborate, triethylamine trifluoromethanesulfonate, dimethylaniline hexafluoroantimonate, diethylaniline hexafluoroantimonate, dimethylaniline tetrafluoroborate, dimethylaniline trifluoromethanesulfonate, pyridine tetrafluoroborate, pyridine hexafluoroantimonate, pyridine hexafluorophosphate 4-methylpyridine hexafluoroantimonate and 4-cyanopyridine hexafluoroantimonate.

Curable Resin Compositions

The curable resin composition of this invention contains an amount of a proton-donating cation polymerization effective to initiate the polymerization reaction at room temperature of the alicyclic epoxy acrylic polymers. This amount varies with particular initiators and polymers used but generally ranges 0.1 to 10%, preferably from 0.3 to 5% by weight relative to the nonvolatile content of the acrylic polymer. Excessive use of the initiator should be avoided since it may adversely affect the properties of the resulting cured products such as water resistance, color and the like.

When the alicyclic epoxy acrylic polymer has a plurality of hydroxyl groups, the composition of this invention may comprise a polyfuctional alicyclic epoxide compound as used in the preparation of group II of acrylic monomers having an alicyclic epoxide function as a crosslinking agent which serves as a reactive diluent as well. The amount of such polyfunctional alicyclic epoxide compounds should be, when used, equal or less than the equivalent relative to the hydroxyl number of the acrylic polymer.

The composition of this invention may also comprise, as a chain extender, a low molecular weight-polyol such as ethylene glycol, diethylene glycol, propylene glycol, neopentyl glycol, 1,4-butanediol, pentaerythritol and trimethylolpropane, or a high molecular weight-polyol such as polyether polyols, polyester polyols and polycaprolactone polyols. The amount of such polyols should be, of course, such that not all alicyclic epoxide functions of the acrylic polymer will be consumed in the reaction with the chain extender.

The composition of the present invention may contain a variety of conventional additives depending upon its end use. For example, the composition for coating purposes may contain a conventional solvent, pigment, UV absorber such as 2-(2'-hydroxyphenyl)benzotriazole or its derivative or 2-hydroxybenzophenone, surface conditioner and the like.

Usually, the proton-donating initiator must be packaged and stored separately from the remainder of the composition and mixed therewith immediately before use.

The following examples are intended to further illustrate the present invention without limiting thereto. All parts and percents therein are by weight unless otherwise indicated.

PRODUCTION EXAMPLE 1

3,4-Epoxycyclohexylmethyl methacrylate

Step A:

A 4 liter, 4 necked flask equipped with a Vigreaux column, thermometer, nitrogen gas tube and vacuum sealer was charged with 1802 g of methyl methacrylate, 841.3 g of cyclohexen-4-ylmethanol, 52.8 g of hydroquinone and 26.4 g of p-toluenesulfonic acid. The reactants were stirred while blowing nitrogen gas at a bath temperature of 100° C. until a distillate began to flow out from the column. Then the bath temperature was raised gradually while maintaining the top temperature of the column below 70° C. The reaction was continued for additional 6 hours and then stopped when the bath temperature was 120° C. 605 g of the distillate was collected. Then the reaction mixture was distilled under vacuum to remove unreacted methyl methacrylate and the resulting cyclohexen-4-ylmethyl methacrylate was purified by fractional distillatin under reduced pressure. Yield, 1279 g (94.6% of theory), b.p. 67° C./0.2 mmHg.

Step B:

A 8 liter, 4 necked flask equipped with a thermometer, cooling jacket, stirring means and drip funnel was charged with 200 g of cyclohexen-4-ylmethyl methacrylate produced in Step A and 1200 ml of methylene chloride. The reactants were cooled to a temperature below 10° C. A solution of 263.6 g of m-chloroperbenzoic acid (80% purity, Kishida Chemicals) in 2800 ml of methylene chloride was added thereto dropwise over 3 hours and then allowed to react for additional 3 hours with stirring. After the reaction, an amount of 10% aqueous solution of sodium sulfite was added to the reaction mixture and allowed to react at room temperature for 1 hour to decompose unreacted perbenzoate. After having confirmed the absence of perbenzoate using starch-iodine indicator paper, the reaction mixture was washed with 1000 ml of an aqueous solution containing 81 g of sodium carbonate and then with an amount of saline successively. Thereafter the mixture was dried over magnesium sulfate and evaporated under reduced pressure with addition of 40 mg of p-methoxyquinone as a polymerization inhibitor to remove the solvent. 206 g of crude product of the titled compound was obtained. Yied: 95% of theory.

$^1$H-NMR (in CDCl$_3$, TMS standard, ppm), 1.4–2.4 (m, 7H); 3.15, 3.19 (m, 2H); 3.92, 3.96 (d, 2H); 5.55(s, 1H); 6.09 (s, 1H)

PRODUCTION EXAMPLE 2

5,6-Epoxy-4,7-methano-perhydroinden-2-yl methacrylate

A 3 liter, 4 necked flask equipped with a thermometer, cooling jacket, stirring means and drip funnel was charged with 166 g of 5,6-epoxy-2-hydroxy-4,7-methanoperhydroindene (CELOXIDE 4000, Daicel Chemical Industries, Ltd.), 87.01 g of pyridine and 1000 ml of benzene. To this was added a mixture of 104, 54 g of methacryloyl chloride and 100 ml of benzene dropwise over 2 hours while keeping the inner temperature at 10° C. After the addition the reaction mixture was stirred for 3 hours at room temperature. After having confirmed the absence of the acid chloride by IR spectrometrically, the reactin mixture was filtered to remove solids, washed with an amount of 5% aqueous solution of sodium carbonate, dried over magnesium sulfate, and evaporated under reduced pressure with addition of 40 mg of p-methoxyquinone to remove the solvent. 199 g (85% of theory) of a crude product of the title compound was obtained.

Structural formula:

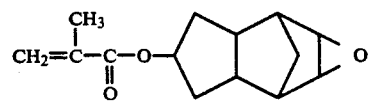

PRODUCTION EXAMPLE 3

2-(1,2-Epoxy-4,7-methano-perhydroinden-5(6)yl)oxymethyl methacrylate

A 3 liter, 4 necked flask equipped with a thermometer, cooling jacket, stirring means and drip funnel was charged with 555 ml of methylene chloride and 95.7 g of 2-(4,7-methano-3a, 4, 5, 6, 7, 7a-hexahydroinden-5(6)-yl)oxyethyl methacrylate (QM 657, Rohm and Haas) of the formula:

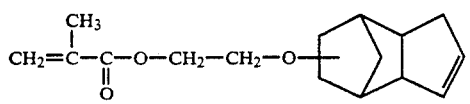

To this was added dropwise a solution of 87 g of m-chloroperbenzoic acid (80% purity, Kishida Chemical) in 888 ml of methylene chloride over 1 hour while keeping the inner temperature at 10° C. and then allowed to react for additional 3 hours with stirring. After the reaction, an amount of aqueous solution of sodium sulfite was added to the reaction mixture and allowed to react at room temperature for 1 hour with stirring to decompose unreacted perbenzoate. After having confirmed the absence of perbenzoate using starch-iodine indicator paper, the reaction mixture was washed with a 5% aqueous solution of sodium carbonate and saline successively, dried over magnesium sulfate, and then evaporated under reduced pressure to remove the solvent. 103.8 g of the title compound was obtained almost in a quantitative yield.

Structural formula:

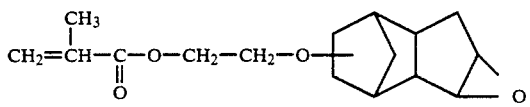

PRODUCTION EXAMPLES 4–10

Acrylic polymers having alicyclic epoxide functions 450 g of xylene placed in a 2 liter, 4 necked flask equipped with a thermometer, drip funnel and stirring means was heated to 130° C. To this was added dropwise Mixture #1 shown in Table 1 below over 3 hours. Thereafter the mixture was stirred for 30 minutes at 130° C. Then Mixture #2 shown in Table 1 was added dropwise over 30 minutes and stirring was continued for additional 1.5 hours at 130° C. After cooling, a viscous, colorless and transparent solution of an acrylic polymer was obtained. The nonvolatile content of the solution and the number average molecular weight of the polymer are also given in Table 1.

TABLE 1

| | PRODUCTION EXAMPLE | | | | | | |
|---|---|---|---|---|---|---|---|
| | 4 | 5 | 6 | 7 | 8 | 9 | 10 |
| Mixture #1, parts | | | | | | | |
| Monomer of Production Ex. 1 | 500 | 500 | | | | | |
| Monomer of Production Ex. 2 | | | | | 580 | | |
| Monomer of Production Ex. 3 | | | | | | 670 | |
| GMA[1] | | | 500 | 500 | | | |
| HEMA[2] | 93 | 93 | | | 50 | 50 | 273 |
| ST[3] | 167 | 167 | | | | | |
| NBA[4] | 240 | 240 | | | 220 | 180 | 341 |
| 2 EHA[5] | | | 120 | 120 | | | |
| MMA[6] | | | 380 | 380 | 150 | 100 | 380 |
| Xylene | 450 | 450 | 450 | 450 | 912 | 912 | 912 |
| Initiator[7] | 100 | 100 | 100 | 100 | 50 | 50 | 50 |
| Mixture #2 | | | | | | | |
| Xylene | 88 | 88 | 88 | 88 | 88 | 88 | 88 |
| Initiator[7] | 5 | 5 | 5 | 5 | 3 | 3 | 3 |
| Properties | | | | | | | |

TABLE 1-continued

| | PRODUCTION EXAMPLE | | | | | | |
|---|---|---|---|---|---|---|---|
| | 4 | 5 | 6 | 7 | 8 | 9 | 10 |
| Mn | 3200 | 3100 | 3300 | 3500 | 8500 | 8200 | 8300 |
| Nonvolatile, % | 65 | 65 | 65 | 65 | 50 | 50 | 50 |

Remarks:
[1] Glycidyl methacrylate
[2] 2-Hydroxyethyl methacrylate
[3] Styrene
[4] n-Butyl acrylate
[5] 2-Ethylhexyl acrylate
[6] Methyl methacrylate
[7] t-Butyl peroctate

EXAMPLES 1–3 and COMPARATIVE EXAMPLES 1–2

Various coating compositions were formulated from varnishes produced in Production Examples 4, 5, 8 and 9 and other components as shown in Table 2 below. The compositions were each applied on a tinplate with a bar coater at a dry film thickness of 20 microns, and allowed to stand at room temperature for 24 hours. The resulting cured films were evaluated for solvent resistance and smoothness. The results are also shown in Table 2.

TABLE 2

| | EXAMPLES | | | COM. EXAMPLES | |
|---|---|---|---|---|---|
| | 1 | 2 | 3 | 1 | 2 |
| Components, parts | | | | | |
| Varnish of Pro. Ex. 4 | 100 | | | | |
| Varnish of Pro. Ex. 8 | | 80 | | | |
| Varnish of Pro. Ex. 9 | | | 100 | | |
| Varnish of Pro. Ex. 5 | | | | | 100 |
| CELOXIDE 2021[8] | | 20 | | 100 | |
| Initiator A[9] | 1 | | 1 | 1 | 1 |
| Initiator B[10] | | 1 | | | |
| Acetone | 5 | | 5 | 5 | 5 |
| Evaluation | | | | | |
| Solvent resistance[11] | Good | Good | Good | Good | Not Good |
| Smoothness[12] | Good | Good | Good | Not Good | Good |

Remarks:
[8] Alicyclic epoxide compound sold by Daicel Chemical Industries, Ltd.
[9] Dimethylaniline hexafluoroantimonate
[10] Boron trifluoride-diethyl ether complex
[11] Rubbing test with xylene-impregnated fabric at 20 reciprocations.
Good: No change.
Not Good: Dissolved or peeled off.
[12] Visual judgement.
Good: Continuously flat surface with high gloss.
Not Good: Uneven surface or no gloss.

EXAMPLES 4–6 and COMPARATIVE EXAMPLES 3

Various coating compositions were formulated from varnishes produced in Production Examples 4, 6 and 7 and other components as shown in Table 3 below. The compositions were each applied on a tinplate with a bar coater at a dry film thickness of 20 microns, and allowed to stand at room temperature for 24 hours. The resulting cured films were evaluated for solvent resistance and smoothness. The results are also shown in Table 3.

TABLE 3

| | EXAMPLES | | | COM. EX. |
|---|---|---|---|---|
| | 4 | 5 | 6 | 3 |
| Components, parts | | | | |
| Varnish of Pro. Ex. 4 | 100 | 80 | | |
| Varnish of Pro. Ex. 6 | | | 80 | |
| Varnish of Pro. Ex. 7 | | | | 100 |
| Varnish of Pro. Ex. 10 | | 20 | | |

TABLE 3-continued

| | EXAMPLES | | | COM. EX. |
|---|---|---|---|---|
| | 4 | 5 | 6 | 3 |
| CELOXIDE 2021 | | 20 | | |
| Initiator C[13] | 1 | 1 | 1 | 1 |
| Acetone | 5 | 5 | 5 | 5 |
| TiO$_2$[14] | 25 | 25 | 25 | 25 |
| Evaluation | | | | |
| Solvent resistance | Good | Good | Good | Not Good |
| Smoothness | Good | Good | Good | Good |

Remarks:
[13] Pyridine hexafluoroantimonate
[14] Dispersed in a red devil for 30 minutes.

What is claimed is:

1. A curable resin composition comprising:
   (a) an acrylic polymer having a plurality of alicyclic epoxide functions and a number average molecular weight, of greater than 1,000, said acrylic polymer being a homopolymer of an acrylic monomer having at least one alicyclic epoxide function or a copolymer of said acrylic monomer with an ethylenically unsaturated monomer free from said alicyclic epoxide function and an alkoxysilane function; and
   (b) an amount effective to initiate the curing reaction of said acrylic polymer at room temperature of a cation polymerization initiator selected from the group consisting of a Bronsted acid, a Lewis acid, an amine trifluoromethane sulfonate, an amine tetrafluoroborate, an amine hexafluoroantimonate, an amine hexafluoroarsenate and an amine hexafluorophosphate.

2. The curable resin composition as claimed in claim 1, wherein said acrylic polymer has a number average molecular weight between about 3,000 and about 10,000.

3. The curable resin composition as claimed in claim 1, wherein said acrylic monomer having at least one alicyclic epoxide function is an acrylate or methacrylate ester of an epoxidized alicyclic alcohol, a reaction product of a polyfunctional alicyclic epoxy compound with acrylic or methacrylic acid, or an adduct of an epoxidized alicyclic alcohol with an isocyanate of an acrylic monomer.

4. The curable resin composition as claimed in claim 1, wherein said acrylic polymer is a copolymer of said acrylic monomer having at least one alicyclic epoxide function with a hydroxy group-containing, ethylenically unsaturated monomer, and wherein said composition further comprises an amount of an polyfunctional alicyclic epoxide compound equal to or less than the equivalent relative to the hydroxyl number of said copolymer.

5. The curable resin composition as claimed in claim 1 further comprising, as a chain extender, a polyol in such an amount that not all alicyclic epoxide function of said acrylic polymer will be consumed in the reaction with said polyol.

* * * * *